(12) United States Patent
Kuo

(10) Patent No.: US 6,315,368 B1
(45) Date of Patent: Nov. 13, 2001

(54) REPLACEABLE SHOCK-PROOF CORNER WHEEL OF A TRUNK

(75) Inventor: Chung-Hsien Kuo, Taipei Hsien (TW)

(73) Assignee: Chaw Khong Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/598,035

(22) Filed: Jun. 21, 2000

(51) Int. Cl.$^7$ ........................................... B60B 23/00
(52) U.S. Cl. ........................ 301/111; 301/125; 190/18 A
(58) Field of Search ............................ 301/111, 114, 301/122, 125, 137, 5.1, 113, 120, 121, 124.1, 126; 190/18 A, 25, 37; 280/47.26; 16/18 R, 18 CG

(56) References Cited

U.S. PATENT DOCUMENTS

| | | | |
|---|---|---|---|
| 5,498,010 | * | 3/1996 | Stube ................................. 190/18 A |
| 5,873,145 | * | 2/1999 | Chou ..................................... 16/46 |
| 5,875,519 | * | 3/1999 | Chou ................................... 301/111 |
| 6,116,196 | * | 9/2000 | Kuo ..................................... 301/120 |
| 6,167,994 | * | 1/2001 | Kuo et al. ........................... 301/111 |
| 6,193,324 | * | 2/2001 | Chang ................................ 301/125 |
| 6,231,130 | * | 5/2001 | Chang ................................ 301/111 |
| 6,253,891 | * | 7/2001 | Miller ................................. 301/111 |

* cited by examiner

Primary Examiner—S. Joseph Morano
Assistant Examiner—Long Bao Nguyen
(74) Attorney, Agent, or Firm—Rosenberg, Klein & Lee

(57) ABSTRACT

A replaceable shock-proof corner wheel of a trunk includes a base, a frame seat, and an elastomer. The base is fixed at corners of a bottom of a trunk body and has a receiving groove. The frame seat is externally combined to the base and has a wheel hole communicated with the receiving groove. The wheel seat includes a wheel cover, a roller, and an elastomer and is received in the receiving groove of the base. The wheel cover is combined to the base by the covering of the frame seat and thus is confined therein. The roller is pivotally installed in the wheel cover and part of the roller protrudes out from the wheel hole of the frame seat. The elastomer is installed at a top surface of the wheel cover and is clamped between the wheel cover and the wall of the receiving groove so that the wheel seat has a buffer shock-proof elasticity with respect to the base. Thereby, the trunk can be pulled steadier and comfortably without any noise. The safety of the contents in the trunk will not be affected and the corner wheels are retained in a steady condition. Moreover, the present invention can be detached and assembly rapidly so that the destroyed corner wheels can be maintained and updated rapidly.

2 Claims, 4 Drawing Sheets

REPLACEABLE SHOCK-PROOF CORNER WHEEL OF A TRUNK

FIELD OF THE INVENTION

The present invention relates to a replaceable shock-proof corner wheel of a trunk, and especially to corner wheels installed at the corners of the bottom of a trunk, thereby, the trunk can be pulled conveniently. Further, by a special design, not only the shock-proof effect is provided to a trunk, but also it can be maintained conveniently.

BACKGROUND OF THE INVENTION

In general, the corners at bottom of a trunk are mounted with corner wheels for pulling the trunk by pull a telescopic pull rod. However, the installation of the corner wheels has many various variations for meeting the requirement of the users. For example, the corner wheel can rotate freely, telescopically move according to the terrain; be hidden; roll in ladder; be enhanced in stability. However, in these design, the corner wheels are retained in the trunk body fixedly and thus is lack of flexibility. Therefore, as the trunk rolls in an uneven ground, it is often large vibrations occurs. Not only the hand holds the telescopic pull rod feels uncomfortable and even the hand leaves from the pull rod so that the trunk lose of control. Moreover, the objects in the trunk will vibrate and collide with each other. Therefore, the objects unendurable to vibration will be harmed, for example, electronic products and glass products. Furthermore, the stability of the corner wheels will be destroyed and thus, noise is induced. In simply, the conventional corner wheels are poor in shock-proof. Even some corner wheels adapts spring or other elastic elements as a buffering means. However, these designs require more components and are difficult in design. In the other hand, as a trunk is used for a long time, the corner wheel is possible destroyed due to too large friction or too large vibration. But the conventional corner wheel is fixedly secured to the trunk, it is difficult to detach, maintain, and update, the normal use of the trunk will be affect so as to induce a great trouble to the user.

Therefore, there is an eager demand for a novel replaceable shock-proof corner wheel of a trunk which can improve the defects in the prior art. Not only the shock-proof effect is provided to a trunk, but also it can be maintained conveniently.

SUMMARY OF THE INVENTION

Accordingly, the primary object of the present invention is to provide a replaceable shock-proof corner wheel of a trunk, thereby, the trunk can be pulled steadier and comfortably without any noise. The safety of the contents in the trunk will not be affected and the corner wheels are retained in a steady condition.

In order to achieve the aforesaid object, the present invention provide a replaceable shock-proof corner wheel of a trunk comprises a base, a frame seat, and an elastomer. The base is fixed at corners of a bottom of a trunk body and has a receiving groove. The frame seat is externally combined to the base and has a wheel hole communicated with the receiving groove. The wheel seat comprises a wheel cover, a roller, and an elastomer and is received in the receiving groove of the base. The wheel cover is combined to the base by the covering of the frame seat and thus is confined therein. The roller is pivotally installed in the wheel cover and part of the roller protrudes out from the wheel hole of the frame seat. The elastomer is installed at a top surface of the wheel cover and is clamped between the wheel cover and the wall of the receiving groove so that the wheel seat has a buffer shock-proof elasticity with respect to the base.

Another object of the present invention is to provide a replaceable shock-proof corner wheel of a trunk, wherein the present invention can be detached and assembled rapidly so that the destroyed corner wheels can be maintained and updated rapidly.

In order to achieve the aforesaid object, the present invention provides a replaceable shock-proof corner wheel of a trunk comprising a base, a frame seat, and an elastomer. The base is fixed at corners of a bottom of a trunk body and has a receiving groove. The wheel seat comprises a wheel cover, a roller, and an elastomer and is received in the receiving groove of the base for tightly positioned. Therefore, in assembly, it is only necessary to put the wheel seat in the receiving groove and then fix the frame seat. The assembly work is easy and rapidly. On the contrary, when the roller is worn or destroyed because of using for a long time, it is only necessary to detach the frame seat, then the whole wheel seat can be maintained or updated properly.

The various objects and advantages of the present invention will be more readily understood from the following detailed description when reading in conjunction with the appended drawing.

DETAILED DESCRIPTION OF THE PREFERRED EMBODIMENTS

Figure 1:
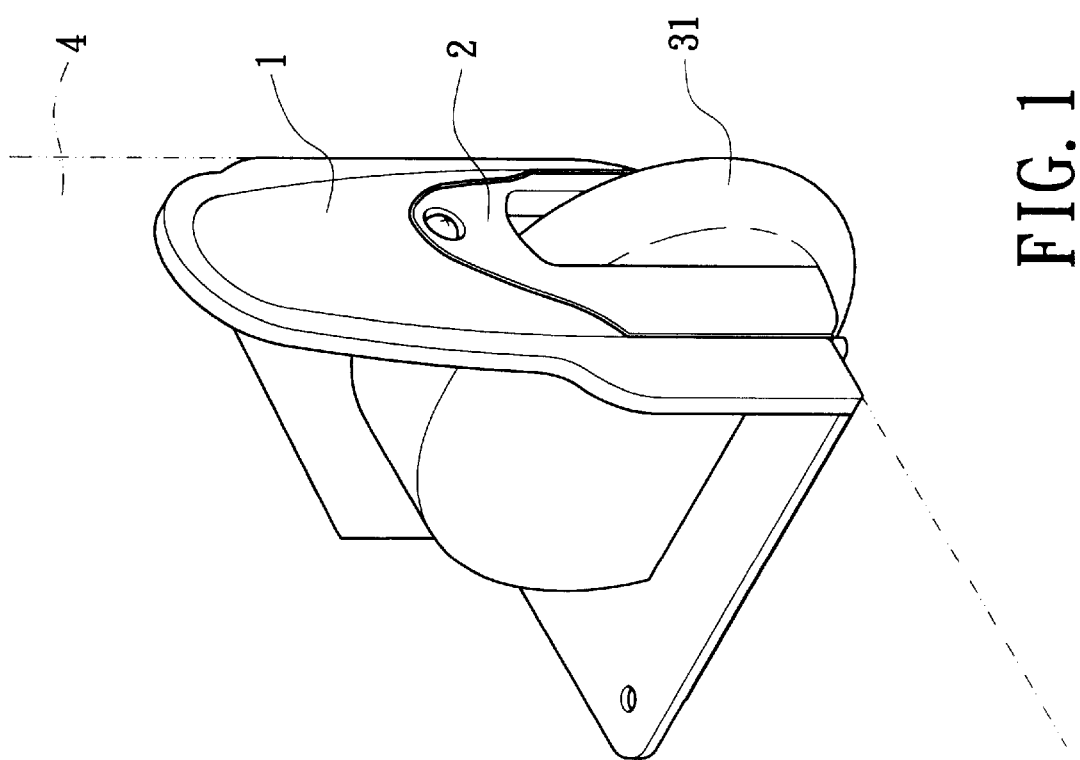
FIG. 1 is a structural perspective view of the present invention.
Figure 2:
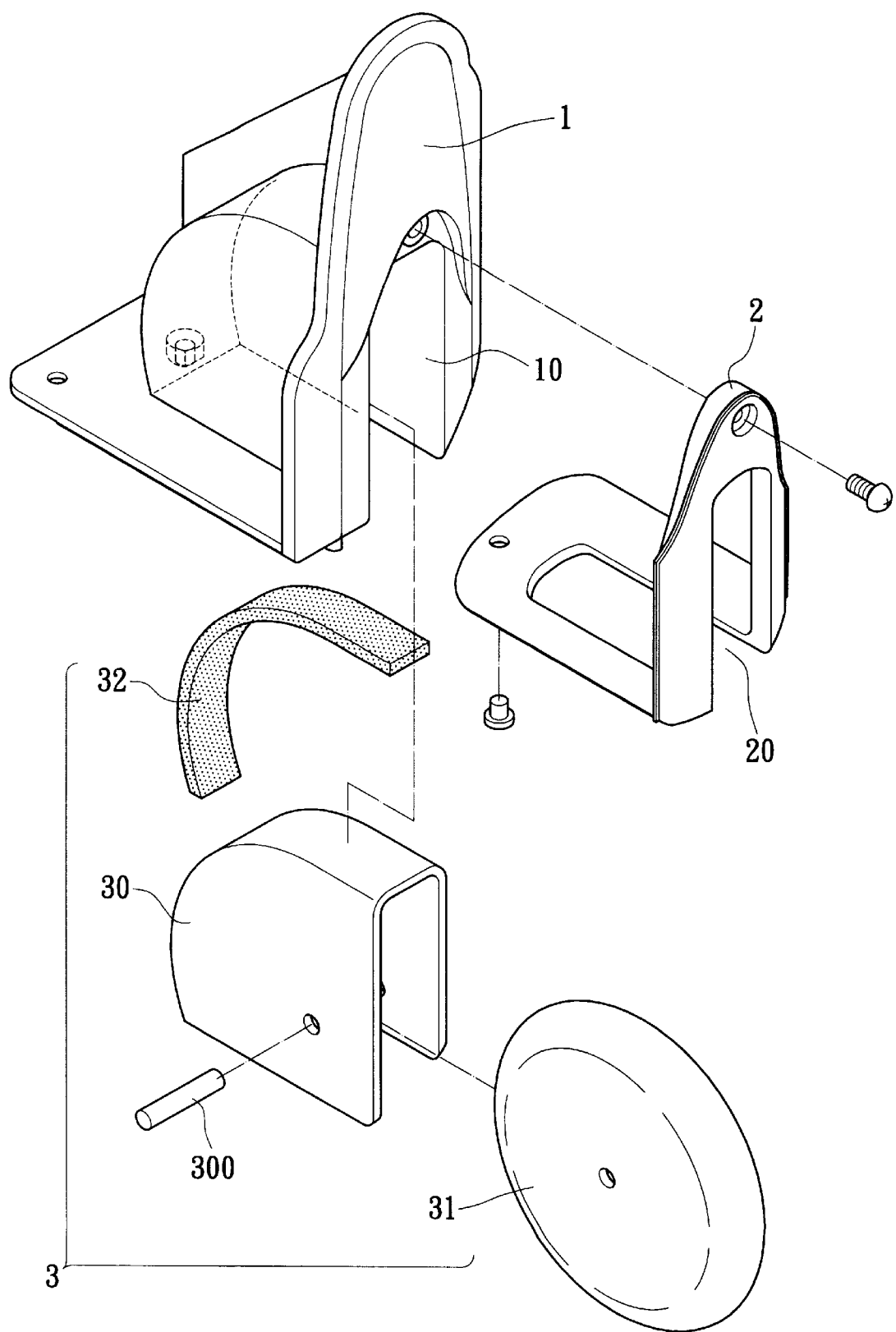
FIG. 2 is an exploded perspective view showing the detail structure of the present invention.
Figure 3:
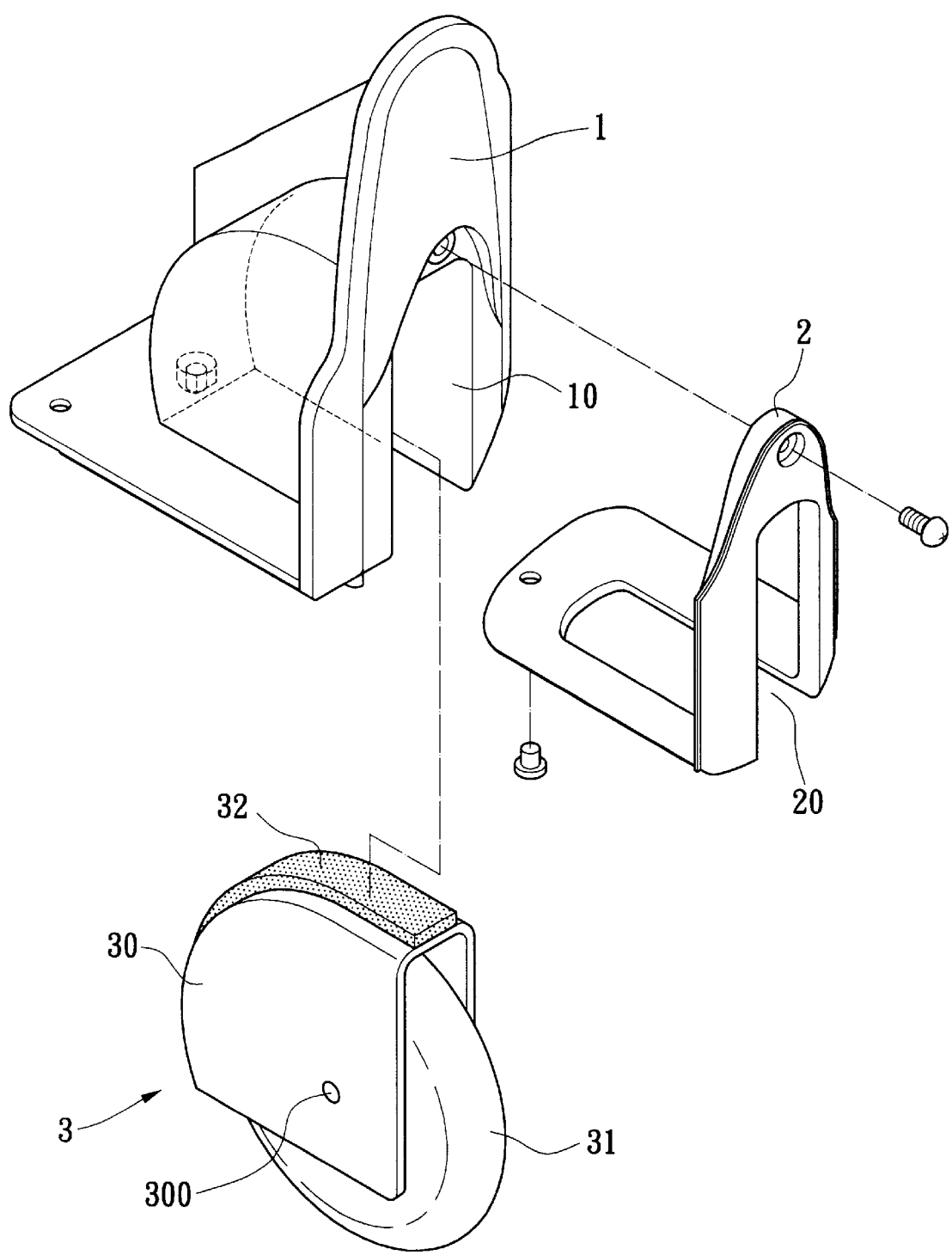
FIG. 3 is an exploded perspective view showing large parts of the present invention.

Referring to FIGS. 1 to 3, the exploded and perspective view for the embodiment of the replaceable shock-proof corner wheel of a trunk according to the present invention is illustrated. The shock-proof corner wheel includes a base 1, a frame seat 2, and a wheel seat 3.

The base 1 has an L shape and is fixed to the corner at bottom of the trunk body and has a receiving groove 10.

The frame seat 2 has an approximately L shape with the base 1. The frame seat 2 encloses the outer side and lower side of the base 1 and has a wheel hole 20 communicated with the receiving groove 10.

Figure 5:
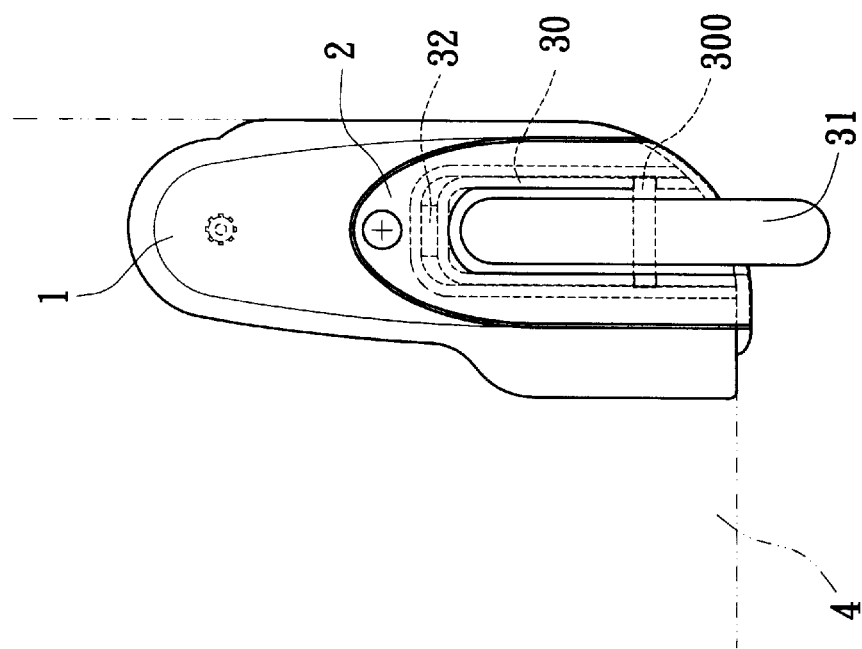
FIG. 5 is a front view of the assembled structure in the present invention.
Figure 4:
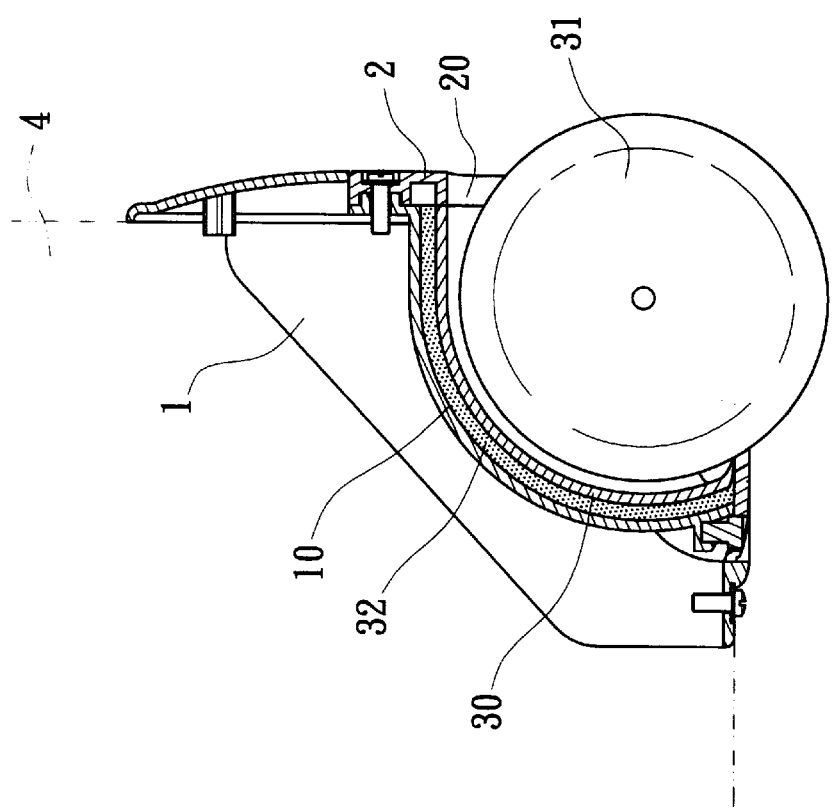
FIG. 4 is a lateral cross sectional view of the assembly structure in the present invention.

The wheel seat 3 includes a wheel cover 32, a roller 31 and an elastomer 32 and is received in the receiving groove 10 of the base 1. The wheel cover 30 is rightly confined from the outer side and the lower side thereof by the frame seat 2. The roller 31 is pivotally installed in the wheel cover 30 by a pivotal shaft 300 and protrudes out of the wheel hole 20 of the frame seat 2. The elastomer 32, such as rubber or blowing cotton, etc., is installed at top of the wheel cover 30 and is clamped between the wheel cover 30 and groove wall of the receiving groove 10, as shown in FIGS. 4 and 5, so that the wheel seat 3 has a buffered shock-proof elastic force with respect to the base 1.

It is appreciated from the aforesaid structure, the elastomer 32 with a proper compressing elasticity is clamped between the wheel seat 3 and the base 1 of the trunk 4 so that the roller 3 has a buffered elasticity with respective to the trunk body. Even the roller 3 rolls in a coarse surface, the elastomer 3 may sufficiently absorb the vibration from the wheel seat 3 so as to reduce the effect to the trunk body. Therefore, not only the user may hold the telescopic handle comfortably and steadily, but also the whole corner wheel will not be impacted by shocks and thus be destroyed. Another, no noise occurs, and thus, the present invention is practical and convenient.

In the other hand, since the independent wheel seat 3 formed by the wheel cover 30, roller 31 and elastomer 32 is mounted on the base 1 by being enclosed by the frame seat 2 so as to be received and clamped between the frame seat 2 and the base 1. Thus, the assembly work is easy and rapidly. On the contrary, when the roller 3 is worn or destroyed because of using for a long time, it is only necessary to detach the frame seat 2, then the whole wheel seat 3 can be maintained or updated properly.

In summary, the replaceable shock-proof corner wheel of a trunk disclosed in the present invention can substantially solve the problems in the prior art.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A replaceable shock-proof corner wheel of a trunk comprising:

a base fixed at a corner of a bottom of a trunk body and having a receiving groove;

a frame seat externally combined to the base and having a wheel hole communicated with the receiving groove;

a wheel seat comprising a wheel cover, a roller, and an elastomer and being received in the receiving groove of the base; wherein the wheel cover is combined to the base by being covered by the frame seat and thus is confined therein; the roller is pivotally installed in the wheel cover and part of the roller protrudes out from the wheel hole of the frame seat; and the elastomer is installed at a top surface of the wheel cover and is clamped between the wheel cover and the wall of the receiving groove so that the wheel seat has a buffer shock-proof elasticity with respect to the base.

2. The replaceable shock-proof corner wheel of a trunk as claimed in claim 1, wherein the base has an approximately L shape, and the frame seat has a L shape for matching with that of the base.

* * * * *